Nov. 18, 1969 HIROO AKAMATSU ET AL 3,479,518
SYSTEM FOR PHOTO-ELECTRICALLY DETECTING AND MARKING
DEFECTS IN A MOVING SHEET WITH TWO
DISTINGUISHABLE MARKING MATERIALS

Filed Feb. 17, 1965 3 Sheets-Sheet 1

INVENTORS
HIROO AKAMATSU
TAKANOBU MORITA
MIKIO KAMEI
YASUHIRO NOZOE

BY Paul M. Craig, Jr.
ATTORNEY

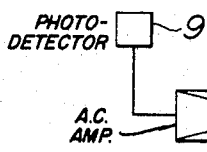
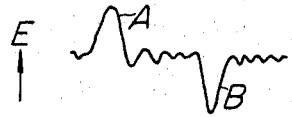
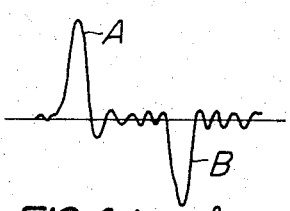
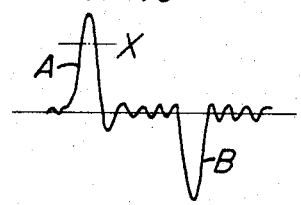
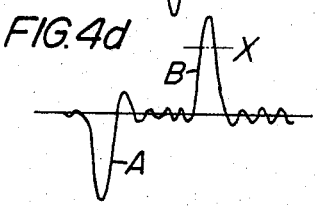
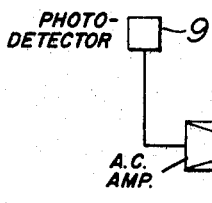

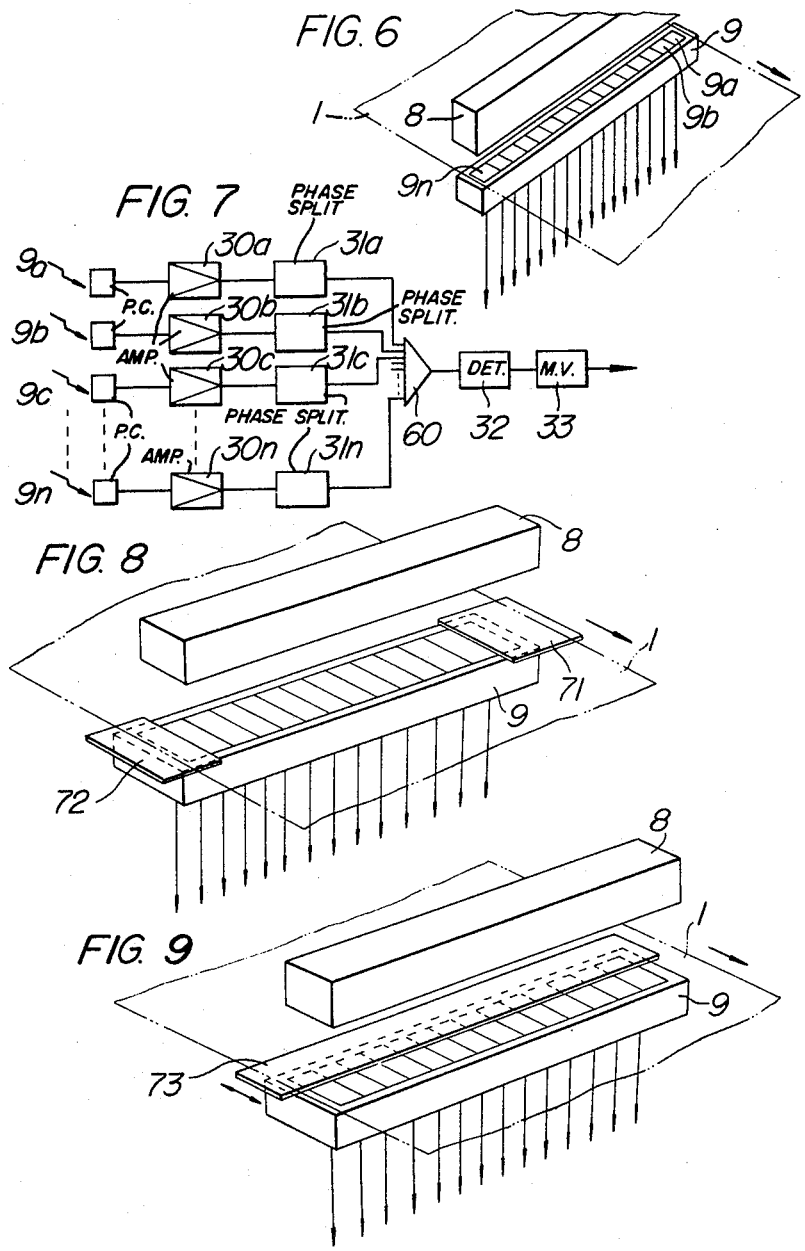

United States Patent Office 3,479,518
Patented Nov. 18, 1969

3,479,518
SYSTEM FOR PHOTO-ELECTRICALLY DETECTING AND MARKING DEFECTS IN A MOVING SHEET WITH TWO DISTINGUISHABLE MARKING MATERIALS
Hiroo Akamatsu, Takatsuki-shi, and Takanobu Morita, Mikio Kamei, and Yasuhiro Nozoe, Kyoto, Japan, assignors to Tateisi Electronics Co., Ukyo-ku, Kyoto, Japan, a corporation of Japan
Filed Feb. 17, 1965, Ser. No. 433,406
Claims priority, application Japan, Feb. 18, 1964, 39/8,462; Feb. 19, 1964, 39/8,897, 39/8,898; Oct. 7, 1964, 39/57,205, 39/57,207
Int. Cl. G01n 21/30
U.S. Cl. 250—219     5 Claims

ABSTRACT OF THE DISCLOSURE

System for photo-electrically detecting and marking defects in a moving sheet including a source of light positioned on one side of said moving sheet and a photoelectrical detector positioned on the opposite side of said moving sheet for receiving light from said light source through said moving sheet, an alternating current amplifier connected to said photo-electrical detector for amplifying only alternating current components of the signal generated by the photo-electrical detector, means for detecting components of the amplified signal above a predetermined level and for generating an output signal in response thereto, and marking means for applying a suitable marking material to the moving sheet in response to said output signal.

---

The present invention relates to a novel and useful system capable of detecting defects such as flaws, stains, soils or holes, thinner portions and the like in a moving sheet of fabric, paper etc., and of marking said defects thereon, electro-magnetically and automatically.

Heretofore, in the well-known system of detecting and marking said defects, the process has been carried out in such a way that when any defective portion in said moving sheet is detected by a detecting means, an alarm is given, and simultaneously the moving sheet is temporarily stopped so that a suitable mark may be manually applied on loops of the sheet to indicate the defective portions, or in another way that a stamping means and the like which may be operated according to an electric signal generated in response to the detection of said defective portions therein, performs automatically and mechanically suitable marking on said loops to point out the defective portion. At any rate, either of the above two ways of the process is by no means desirable due to the fact that there is a fear of harming neither of the above two known ways of accomplishing such detection and marking is by any means made thereon, and moreover the moving sheet must be stopped temporarily to be marked or stamped.

In view of the above-mentioned disadvantages, the present invention is provided with the detecting and marking system which is adapted to automatically apply suitable marking on a moving sheet in which defects are detected, without mechanical contact therewith.

In the detecting and marking system of the present invention, the moving sheet may be advanced between a source of light and a photo-electric element, and when the portions containing defects in the moving sheet pass therebetween. The amount of light as received by the photoelectric element varies. The defective portions in said sheet may be detected by taking advantage of the variation of the light received by the photo-detector. The sensibility of said photoelectric element in detecting the defective portions in said sheet may be indicated by the ratio of the transmitted light detected through the normal sheet devoid of a defect to that detected through the uneven sheet containing a defect, and, to say more exactly, the ratio of the amount of light as received by the photo-electric element after it has been transmitted through a certain area of the sheet not containing a defective portion to that amount of light detected after it has been transmitted through the same area of the sheet containing a defective portion. Hence, even if the defective portion to be detected is small, the lowering of sensibility of the photo-electric element in the detection of defective portions may be prevented by diminishing the light receiving area of the element.

Said photo-electric element is electrically connected with an electric circuit which generates a signal in response to the amount of light received by said element. The electric circuit may be so arranged that in case the moving sheet is passing between the source of light and the photo-electric element, when said sheet is the normal one not containing a defective portion therein, a signal is not generated in the circuit due to fact that the amount of light transmitting through said sheet is within the predetermined range, whereas when a section of the sheet containing such defects as stains, soils and the like passes between them, the amount of light transmitting through said sheet section decreases, or when a section thereof containing such defects as holes, thinner portions and the like passes between them, the amount of light transmitting through said sheet section increases, and in such cases a suitable electric signal may be generated from said circuit because said photo-electric element will receive the transmitted light amount which is out of the predetermined range. The signal generated at said circuit operates a marking means in the present system in order to make colored liquid or powder material shoot towards the sheet, so that the material can adhere to a loop of said sheet for indicating defective portions therein. As above explained, an electric signal may be generated from said signal generating circuit only when the light receiving amount of said photo-electric element is smaller or bigger than the predetermined range. Therefore, by providing two kinds of signal generation circuits, namely one circuit generating a signal responsive to the light receiving amount smaller than the predetermined range, and the other circuit generating a signal responsive to the light receiving amount greater than the same, the above-mentioned marking means may be designed as follows: in case of small amount of transmitted light through the defective portions such as stains or soils, one marking means connected to the former circuit acts so as to shoot forth one colored liquid or powder material towards the sheet, or in case of great amount of transmitted light through the defective portions such as holes or thinner portions, the other marking means connected to the latter circuit acts so as to shoot forth another colored liquid or powder material towards the sheet. According to the embodiment stated above, such defects as stains, soils, etc. that are required to be washed out and such defects as holes, thinner portions, etc. that are required to be mended can be easily and conveniently discriminated.

Although said photo-electric element has been described to consist of only one unit, it is preferably designed so as to consist of a plurality of units arranged at a substantial right angle to the moving direction of the sheet. In this arrangement, since at the time a defective portion of the sheet is passing on a respective unit, each unit may be energized to cause the electric circuit connected to the respective photo-electric unit to independently generate an electric signal, it may be possible to carry out the marking operation in every unit by associating the same number of marking means with said units, respectively. In case the width of the sheet is narrow; the sheet moves in a zigzag line; and the disparity lies in the width of said sheet itself, there will result such a situation that the sections of the photo-electric element positioned at the opposite ends thereof act as if they detected a defective portion by directly receiving a light beam from the source of light. Such a disadvantage, however, may be overcome by providing shielding plates between the sheet and the photo-electric element at the vicinity of the opposite ends thereof, thereby to prevent the light beam radiated from said source from directly projecting on said element without transmitting through the sheet. Such an arrangement is also advantageous in that it is applicable to the detection of defects in various sorts of the sheet having diverse widths. In this case, since the opposite edges of the sheet passing above the shielded sections of the photo-electric element cannot be detected, it is needless to say that they are afterwards cut off.

In the present system, as above explained, only transmission light through the sheet may be utilized to detect both deflective portions such as stains and soils which decrease the sheet transmission light and defective portions such as holes and thinly woven portions which increase the sheet transmission light. In the well-known system, however, two detective routes have been adopted in such a manner as utilize the transmission light received by one photo-electric element when the sheet contains defective portions such as holes and thinner portions, and the reflected light from the sheet received by the other photo-electric element when the sheet contains defective portions such as stains and soils. Therefore, the detection, under the well-known system, of the sheet having large width may require a considerable number of photo-electric elements and electric circuits, and accordingly such an arrangement has a disadvantage of being excessively expensive besides having extreme complexity.

Furthermore, in the conventional system, the so-called "direct current amplification system" has been adopted for amplifying the output generated from the photo-electric element, namely the absolute valve of the electric output generated in response to the light receiving amount thereof has been amplified. In this system, however, they are such disadvantages that negligible defects not of interest from the object of detection may be detected, external noises may be detected, and suitable correction relating to the electric circuit are needed when the sheet has not a uniform width, and so on.

However, in the present system, such disadvantages as associated with said direct current amplification system may be readily overcome by using an alternating current amplifier that deletes direct current components and amplifies only variable or alternating current components of the output waves generated in said photo-electric element in response to the variation of the transmitted light through the moving sheet.

The primary feature of this invention is to detect and mark photo-electrically and automatically defective portions in a moving sheet by a system comprising a defect detecting means having an elongated source of light positioned at one side of the sheet and extending transversely thereto and a photo-electric element positioned at the other side of the sheet so as to receive a light beam radiated from said source of light and then transmitted through the sheet; an alternating current amplifier which eliminates direct current components and amplifies only alternating current components of signal waves generated from said photo-electric element in response to the variation of said transmitted light; electric circuits for detecting higher components than the predetermined level from said signal waves amplified by said amplifier and then generating an output signal; and a marking means which operates in response to said output signal to apply suitable marking material onto said moving sheet.

Another primary feature of this invention is to shoot forth and adhere colored liquid or powder material to said moving sheet by an electro-magnetic means which operates in response to said signal generated from said detective and signal generating circuits.

Further features of this invention are such that said defect detecting means comprises a source of light which is at least equivalent in length to the width of the sheet and a photo-electric element comprising a plurality of units; the waves from the alternating current amplifiers which are respectively connected with each of said units are logically summed; each of said waves is divided into two kinds of waves having the same phase as it is and the reversed phase prior to the logical summing thereof; and that the light recovering amount of said photo-electric element is controlled by providing two shielding means so as to shift transversely to the sheet on the opposite ends of the photo-electric element adjacent to the longitudinal edges of the sheet and/or by providing a shielding means transversely extending on said element so that it may be shifted to the moving direction of said sheet, and so on.

These and other objects, features and advantages of this invention will be made more apparent from the following description taken in reference to the accompanying drawing which shows some preferable embodiments of this invention and in which:

FIG. 3 is a block diagram showing an embodiment of electric circuits in accordance with the present invention;

FIGS. 4a, 4b, 4c and 4d are explanatory diagrams showing some output waves which are produced in the present system;

FIG. 5 is a block diagram similar to FIG. 3 showing another embodiment of electric circuits in accordance with the present invention;

FIG. 6 is a perspective diagram showing another embodiment of the detecting means;

FIG. 7 is a block diagram showing another embodiment of the electric circuits;

FIG. 8 is a perspective diagram similar to FIG. 6 showing another embodiment of the detecting means;

FIG. 9 is a perspective diagram similar to FIG. 6 showing a further embodiment of the detecting means.

Figure 1:
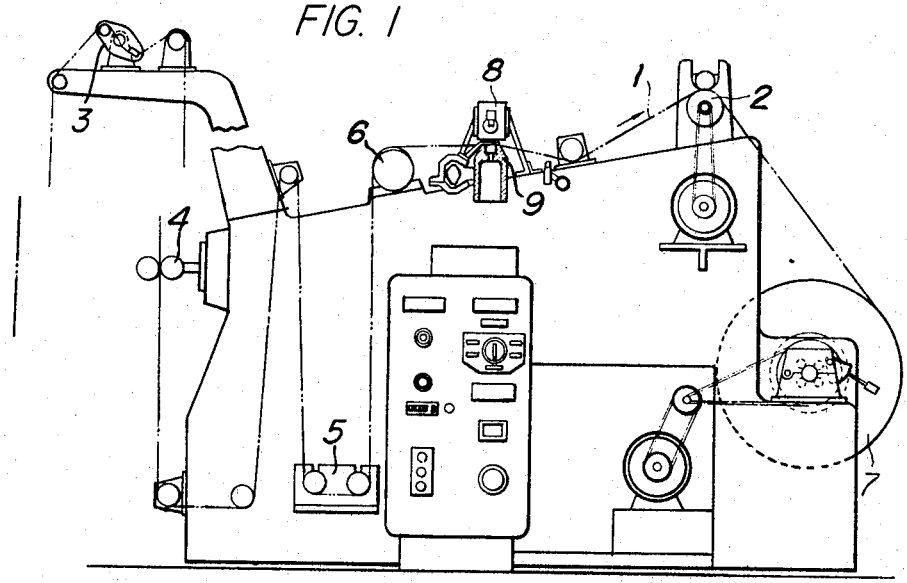
FIG. 1 is a general schematic view of the present system.
Figure 2:
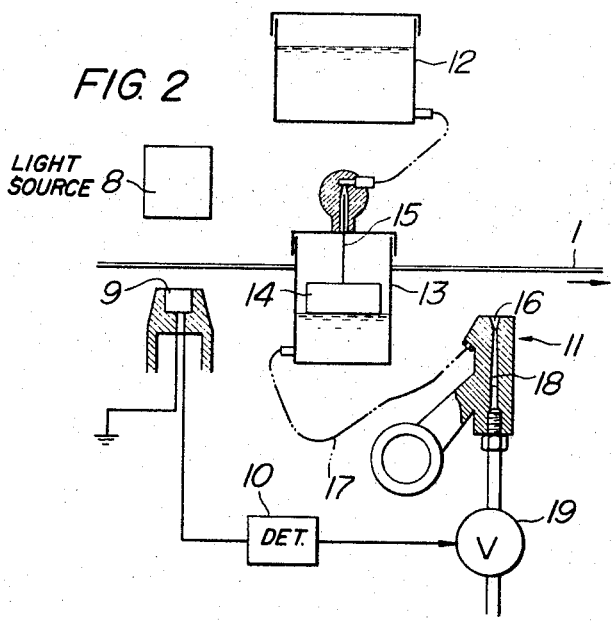
FIG. 2 is a schematic view of a defects detecting means, an injection means for shooting out marking materials, and electro-magnetic means connected thereto.

Referring to FIGS. 1 and 2, a fabric sheet 1 is driven by a driving roller 2 to move in the direction of the arrow, through a swivel-type tension means 3, a cross-guider 4, a meandering correction means 5, and an expander 6, and is wound by a take-up roller 7. A detecting means arranged adjacent to the moving fabric sheet 1 for finding defects therein comprises elongated light source 8 as, for instance, a fluorescent lamp that is located on one side of the surface of the moving sheet and substantially at a right angle to the moving direction thereof and moreover is at least equivalent in length to the width of the sheet, and a photoelectric element 9 such as a photo-electric cell adapted to receive a light beam radiated by the source 8, transmitted through the moving sheet. The photo-electric element 9 is electrically connected to an electric circuit 10 containing a signal generation circuit component which is arranged to generate an electric signal corresponding to the amounts of such light beyond the predetermined range thereof as received by the photo-electric element 9. When a normal sheet which does not contain any defective portion therein passes between the light source 8 and the photo-electric element 9, no electric signal is generated from the electric circuit 10 because the amount of the light transmitted through the moving sheet is within the predetermined range thereof. On the other hand, when a sheet containing such defects as stains or soils therein passes between them, the amount of the light transmitted through the sheet is reduced by the presence of said defective portions, or when a sheet containing such defects as holes or thinner portions therein passes between them, it is clear that the amount of the light transmitted through the sheet increases. In either case, the elecric signal can be suitably generated by means of the electric circuit 10, because the amount of the light transmitted through the sheet is beyond said predetermined range thereof.

A marking means comprises an injection means 11 for shooting out colored liquid, a storage tank 12 for the colored liquid, and a level tank 13 for maintaining the liquid which is introduced therein from said storage tank 12 at a predetermined level at all times. The level tank 13 includes, as is generally known, a float 14 and a needle valve 15 attached to the float 14, and the float cooperates with the valve to maintain the liquid contained in the tank 13 at the predetermined level. The liquid in the level tank is guided to a shooting nozzle 16 formed at the top of the injection means 11 through a flexible hose 17. Of course, the nozzle 16 is positioned at substantially the same height with the liquid level of the tank 13. The injection means 11 is provided with a passage 18 for compressed air which opens at the shooting nozzle 16. The compressed air may be blown out from the nozzle through the passage 18 by the operation of a electro-magnetic valve 19, which may be energized by the electric signal from said circuit 10.

After all, it will be clearly understood that the electro-magnetic valve 19 may be operated through the circuit 10 connected to the photo-electric element 9 when the sheet containing some defective portion passes on the element, and then the compressed air may be blown out from the nozzle 16 through the passage 18, and the colored liquid which has been introduced to the nozzle 16 may be atomized towards the moving sheet 1 together with the blowing operation of said compressed air, so that the atomized colored liquid may be applied to the sheet 1, whereby the defective portion therein can be recognized. Though the liquid may be blown out towards the sheet and attached thereto by the action of the electro-magnetic valve 19 energized at the same time with the detection of the defective portion in the sheet, it may be preferably blown out a little predetermined time after the defective portion was detected, namely the electro-magnetic valve 19 may be preferably arranged so as to operate when the defective portion of the sheet arrives just over the nozzle 16 after it was detected, whereby said liquid can be attached to the area nearest to the defective portion in the sheet.

There is no necessity that the colored liquid must be absolutely blown out in the atomized state. The marking means may be arranged so that the colored liquid held in a compressed state may be blown out by the function of the electromagnetic valve. Also, it will be easily understood that the marking means may be designed so that the colored liquid may be blown out by an injection pump containing a piston as operated by a solenoid which is energized in response to the above electric signal. Furthermore, it will be easily effected to those skilled in the art to incorporate into the present system such marking means as adapted to make use of colored powder instead of colored liquid.

Referring to the electric circuits in the present system, in the drawing, FIG. 3, the photo-electric element 9 is preferably embodied as a solar battery which can produce an output signal instantaneously in response to the light beam received thereby. Now let us assume that the element 9 produces an output signal wave as shown in FIG. 4a in response to the transmitted light beam received through the moving sheet 1 from the light source 8. The wave form shows a characteristic of some sheet section including two defects, in which a pulse A corresponds to a defective portion such as a hole or a thinner portion in the sheet and a pulse B corresponds to a defective portion such as a stain or a soil therin. The above wave form may be changed to one as shown in FIG. 4b through an alternating current amplifier 30, which eliminates direct current components and amplifies only variable or alternating current components of said wave, whereby only the special parts corresponding to the uneven portions of the sheet are substantially amplified, and then the amplified wave may be divided into two kinds of waves one having the same phase as the original and the other having a reversed phase, as shown in FIGS. 4c and 4d through a wave split circuit 31, and then said two waves are introduced into a detecting circuit 32 in which two amplified signal pulses A and B may be detected by the predetermined level X as provided in the circuit 32 when the pulses are higher than the level X, and thus all the defective portions in the sheet can be detected. On the other hand, it is possible, too, to independently detect the defective portions such as holes and thinner portions and ones such as stains and soils by introducing separately the above signal waves as shown in FIGS. 4c and 4d into the detecting circuit 32 and applying the different predetermined detecting levels to the above waves introduced thereinto, respectively. In another arrangement of an electric circuit as shown in FIG. 5, an output wave of the amplifier 30 is divided into two waves by a wave split circuit 31' to be introduced to a detecting circuit 42 in which a suitably predetermined detecting level is provided and a detecting circuit 52 in which another suitably predetermined detecting level is provided. The detecting circuit 42 may detect high level parts than the ordinary wave levels to be resulted from the transmitted light beam through the normal sheet devoid of defects therein, while the detecting circuit 52 may detect lower level parts than the same wave levels as above-described. Shooting means 48, 58 are provided with electro-magnetic valves 49, 59 which are operated in accordance with electric signals transmitted from said detecting circuits 42, 52, respectively. The operation of said valves 49, 59 causes said shooting means 48, 58 to blow out suitable different colored liquid materials toward the moving sheet 1. According to the above arrangement, such defective characters in the sheet as stains, soils, holes, thinner portions, etc. can be easily and conveniently discriminated.

Said alternating current amplifier amplifies only variable or alternating current components having comparatively high levels of output signals generated from said photo-electric element. Therefore, when the frequency of said output signals is too low, said signals cannot be amplified by the alternating current amplifier. Hence the sheet must be moved at comparatively high speed, for instance, from about 1.5 to 3.0 meter per second.

The above-mentioned detecting operation has been effected by detecting the levels of the amplified signal waves, but it may be carried out by measuring an area encircled by the wave pulse and time base. In this case, an integrating circuit may be incorporated into the system before the detecting circuit.

The pulse width of the wave generated from the detecting circuit is too narrow to energize the electro-magnetic means such as the electro-magnetic valve for operating the marking means. Hence, it is necessary to widen the pulse width by using a monostable multivibrator 33, 43, 53 so that said electro-magnetic valve may be strongly energized.

Referring to the embodiments as shown in FIGS. 6 and 7, the sheet 1 moves to the direction of an arrow between the elongated light source 8 extending transversely to the sheet, which is at least equivalent in length to the width of the sheet, and a photo-electric element 9 comprising a plurality of units (9a, 9b, 9c, . . ., 9n) arranged in a line so as to receive the transmitted light beam through the sheet 1 from said light source 8. A plurality of output waves generated from the units (9a, 9b, 9c, . . ., 9n) may be respectively passed through a plurality of alternating current amplifier (30a, 30b, 30c, . . ., 30n) and wave split circuits (31a, 31b, 31c, . . ., 31n), and then logically summed by a logical sum circuit or OR circuit 60. The logically summed wave may be detected by a detecting circuit 32 such as a Schmitt circuit, and then introduced into a monostable multivibrator 33. The operation of the circuits shown in FIG. 7 will need no further explanation, because it will be easily understood from the description relating to the circuits shown in FIG. 3.

As the result of the above-mentioned construction of this system, a signal wave resulted from such a small defect as excluded out of the object to be detected or such an external noise that may be mixed into lead wires connected with the photo-electric element can be made not to be amplified by suitably selecting a frequency characteristic of the alternating current amplifier, because said wave caused by the small defect or said noise has a higher frequency than those of signal waves caused by the defects to be detected. Therefore, the wrong operation of the detecting circuit will not occur by any means.

FIG. 8 shows a modification of the detecting means shown in FIG. 6, in which two shielding plates 71, 72 are provided so as to transversely shift on the opposite ends of the photo-electric element 9, adjacent to the longitudinal edges of the moving sheet 1. This modified detecting means can prevent the light beam radiated from the source 8 thereof from directly projecting on the element 9 without transmitting through the longitudinal end portions of the sheet 1 when it moves in a zigzag line, or the disparity lies in the width of said sheet itself. Now, supposing that the shielding plates 71, 72 be arranged on the end units of the photo-electric element 9 so as to prevent the light beam radiated from the source 8 from projecting on said units after transmitting through the sheet 1, when the sheet 1 has not any defect therein, there is no change in the light amount as received by the photo-electric element 9 so long as the longitudinal edges of the sheet do not move across the surfaces of the photo-electric units which are not covered by said shielding plates 71, 72. Hence, when the plates 71, 72 are suitably positioned, such fear will be dispelled that the moving sheet may be subjected to wrong inspection even if it may move in a zigzag line, or the disparity may lie in the width of said sheet itself. In this connection it should be noted that the shielding plates may be positioned so as to partially cover the photo-electric end units. Though the partially covered units generate the lower wave level than one generated by the remaining units, the former units can effect their normal functions as the latter units. Such may be carried out only by an alternating current amplification system.

FIG. 9 shows a further modification of the detecting means, in which a shielding plate 73 transversely extending on the photo-electric element 9 may be shifted as needed to the moving direction of the sheet 1. In detecting some defect in the sheet, on a certain occasion the detection of the relatively large defects will suffice, but on another occasion only small defects will be requested to be detected. Therefore, if the light receiving area of the photo-electric element 9 shall not be changed, there will happen undesirable circumstances that only small defects cannot be detected. Such a disadvantage may be easily overcome by shifting the shielding plate 73 to the moving direction of the sheet 1 to adjust the effective area of said element 9 for receiving the light beam transmitted through the sheet 1. For example, when it is requested to detect a large area of defect, the effective light receiving area of the element 9 are preferably made large, whereas when a small area of defect is to be detected, said effective area must be small. In other words, therefore, the defective portions in the sheet may be conveniently detected by adjusting said effective area of the element according to the nature of the inspection.

While some embodiments of this invention have been shown and explained, it should be understood that it is capable of many modifications. Changes, therefore, in the arrangement may be made without departing from the spirit and scope of this invention as disclosed in the appended claims.

What is claimed is:

1. System for detecting defective portions in a moving sheet and marking said portions thereon automatically, comprising defect detecting means having an elongated source of light positioned at one side of said moving sheet and extending transversely thereto, and a photo-electric element positioned at the other side of said sheet for detecting light radiated from said source of light and transmitted through the sheet, an amplifier for amplifying signal waves generated by said photo-electric element in response to the variation of said transmitted light, first and second electric circuit means for detecting positive going pulses and negative going pulses, respectively, from output waves amplified by said amplifier and for generating first and second output signals in response thereto, respectively, and first and second marking means for shooting forth respective marking materials which can be distinguished from each other towards said sheet and for applying the materials onto said moving sheet in response to said first and second output signals generated from said first and second electric circuit means, respectively.

2. System according to claim 1 in which said elongated light source is at least equivalent in length to the width of said sheet, and said photo-electric element comprises a plurality of photo-electric units with which a plurality of alternating current amplifiers are respectively connected, and said first and second electric circuit means each contain a logical sum circuit for logically summing all signal waves from said alternating current amplifiers, and further including a plurality of wave splitting circuits for dividing each of the signal waves from said alternating current amplifiers into two waves, one wave being applied to a first electric circuit means and having the same phase as the original wave and the other wave being applied to a second electric circuit means and having a reversed phase.

3. System according to claim 1 in which said defect detecting means includes shielding means provided on the opposite ends of said photo-electric element so as to shift transversely to the sheet, for preventing selected portions of said element from receiving the light beam transmitted through the sheet.

4. System according to claim 1 in which said marking means includes means for shooting marking material in a spray towards the moving sheet and for applying the material onto said moving sheet under control of electro-magnetic means which operate in response to said output signal generated by said electric circuit means.

5. System according to claim 1 wherein said photo-electric element extends across the width of said moving sheet and further including shielding means controlling the exposure area of said photo-electric element, which shielding means extends along the length of said photo-electric element and is shiftable in the moving direction of the sheet, thereby to prevent a selective portion of said element from receiving the light beam transmitted through the sheet.

(References on following page)

References Cited

UNITED STATES PATENTS

| | | | |
|---|---|---|---|
| 2,229,451 | 1/1941 | Gulliksen | 250—219 |
| 2,570,288 | 10/1951 | Todd | 250—219 |
| 2,939,963 | 6/1960 | Rideout | 250—219 |
| 3,105,151 | 9/1963 | Nash | 250—219 |
| 3,257,563 | 6/1966 | Laurent | 88—14 |
| 3,263,086 | 7/1966 | Brosious et al. | 250—219 |
| 3,331,963 | 7/1967 | Lippke | 250—219 |

RALPH G. NILSON, Primary Examiner

T. N. GRIGSBY, Assistant Examiner

U.S. Cl. X.R.

162—198; 356—200